US006318694B1

United States Patent
Watanabe

(10) Patent No.: US 6,318,694 B1
(45) Date of Patent: Nov. 20, 2001

(54) SUPPORT DEVICE FOR SUPPORTING ELECTRONIC DEVICE OBLIQUELY AND PIVOTALLY

(75) Inventor: Shigekane Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/270,847

(22) Filed: Mar. 18, 1999

(30) Foreign Application Priority Data

Aug. 6, 1998 (JP) .................................................. 10-222809

(51) Int. Cl.⁷ .................................................. A47G 29/00
(52) U.S. Cl. ........................ 248/371; 248/178.1; 248/663
(58) Field of Search ................... 248/371, 393, 248/394, 397, 398, 425, 183.1, 183.2, 185.1, 176.3, 919, 922, 923, 63, 178.1

(56) References Cited

U.S. PATENT DOCUMENTS

| | | | | |
|---|---|---|---|---|
| 3,974,994 | * | 8/1976 | Petterson | 248/663 |
| 4,372,515 | * | 2/1983 | Noonan | 248/178.1 |
| 4,483,503 | * | 11/1984 | Gahan | 248/349.1 |
| 4,527,766 | * | 7/1985 | Krenz | 248/371 |
| 4,549,710 | * | 10/1985 | Prince et al. | 248/183.1 |
| 4,562,988 | * | 1/1986 | Bumgardner | 248/349.1 |
| 4,591,120 | | 5/1986 | Bryant-Jeffries et al. | 248/179.1 |
| 4,591,123 | * | 5/1986 | Bradshaw et al. | 248/349.1 |
| 4,640,485 | * | 2/1987 | Day et al. | 248/422 |
| 4,986,503 | * | 1/1991 | Kabat | 248/181.2 |
| 5,732,922 | * | 3/1998 | Jeon | 248/371 |
| 5,769,369 | * | 6/1998 | Meinel | 248/176.1 |

FOREIGN PATENT DOCUMENTS 4-208985    7/1992   (JP) .

* cited by examiner

Primary Examiner—Anita King
(74) Attorney, Agent, or Firm—Staas & Halsey LLP

(57) ABSTRACT

To provide a compact support device, the operation of which is smooth and easy, the fixation of which can be positively conducted, for supporting an electronic device tiltably and pivotally, there is provided a support device comprising: an upper member; a base member; a convex engagement surface provided on one of the upper member and the base member; a concave engagement surface provided on the other of the upper member and the base member, the profile of the concave engagement surface agreeing with the convex engagement surface; a drive mechanism for transferring a state of engagement of the convex engagement surface with the concave engagement surface from a frictional engagement state to a disengagement state; a perpendicular shaft penetrating both engagement surfaces; and a horizontal shaft arranged in an upper portion of the perpendicular shaft, wherein the upper member and the base member can be relatively rotated round an axis of the perpendicular shaft, the upper member and the perpendicular shaft can be relatively rotated round an axis of the horizontal shaft, the drive mechanism can move the perpendicular shaft in the upward direction for transferring the state, and the drive mechanism includes either a plate cam, a translation cam or a lever.

5 Claims, 3 Drawing Sheets

SUPPORT DEVICE FOR SUPPORTING ELECTRONIC DEVICE OBLIQUELY AND PIVOTALLY

BACKGROUND OF THE INVENTION

1. Field of the Invention

The present invention relates to a support device for supporting an electronic device obliquely and pivotally.

2. Description of the Related Art

Japanese Unexamined Patent Publication No. 4-208985 discloses a tilt mechanism used for a display device. In this tilt mechanism, a convex surface of a convex portion, which is formed into an arc-shape, is supported by a member, the friction coefficient of which is low. Therefore, a main display body can be tilted in the upward and downward direction. However, this mechanism is not provided with a function of rotating or revolving the main display body.

Japanese Unexamined Patent Publication No. 58-14887, which corresponds to the U.S. Pat. No. 4,591,120, discloses a support capable of tilting and rotating, comprising: an upper member (platform) having a convex engagement surface; and a base member having a concave engagement surface, the concave engagement surface agreeing with the convex engagement surface, wherein the platform is locked when a shaft penetrating both engagement surfaces are pushed down.

However, the above support is disadvantageous as follows. Irrespective of a state of lock or unlock, both engagement surfaces are substantially contacted with each other at all times. Therefore, a tilting motion and rotating motion can not be conducted smoothly.

SUMMARY OF THE INVENTION

The present invention provides a support device by which the above problems of the prior art can be solved.

In order to solve the above problems, the present invention provides a support device for supporting an electronic device obliquely and pivotally having an upper member and a base member, comprising: a convex engagement surface provided on one of the upper member and the base member; a concave engagement surface provided on the other of the upper member and the base member, the profile of the concave engagement surface agreeing with the convex engagement surface; and a drive mechanism for transferring a state of engagement of the convex engagement surface with the concave engagement surface from a frictional engagement state to a disengagement state. Preferably, the support device further comprises a perpendicular shaft penetrating both engagement surfaces, wherein the upper member and the base member can be relatively rotated round an axis of the perpendicular shaft. Preferably, the support device further comprises a horizontal shaft arranged in an upper portion of the perpendicular shaft, wherein the upper member and the perpendicular shaft can be relatively rotated round an axis of the horizontal shaft. Preferably, the drive mechanism can move the perpendicular shaft in the upward direction for transferring a state. Preferably, the drive mechanism includes a plate cam. Preferably, the drive mechanism includes a translation cam. Preferably, the drive mechanism includes a lever.

BRIEF DESCRIPTION OF THE DRAWINGS

These and other objects of the present invention will become apparent from the following detailed description of the preferred embodiment of the invention, taken in connection with the accompanying drawings.

In the drawings.

DETAILED DESCRIPTION OF THE INVENTION

Figure 1:
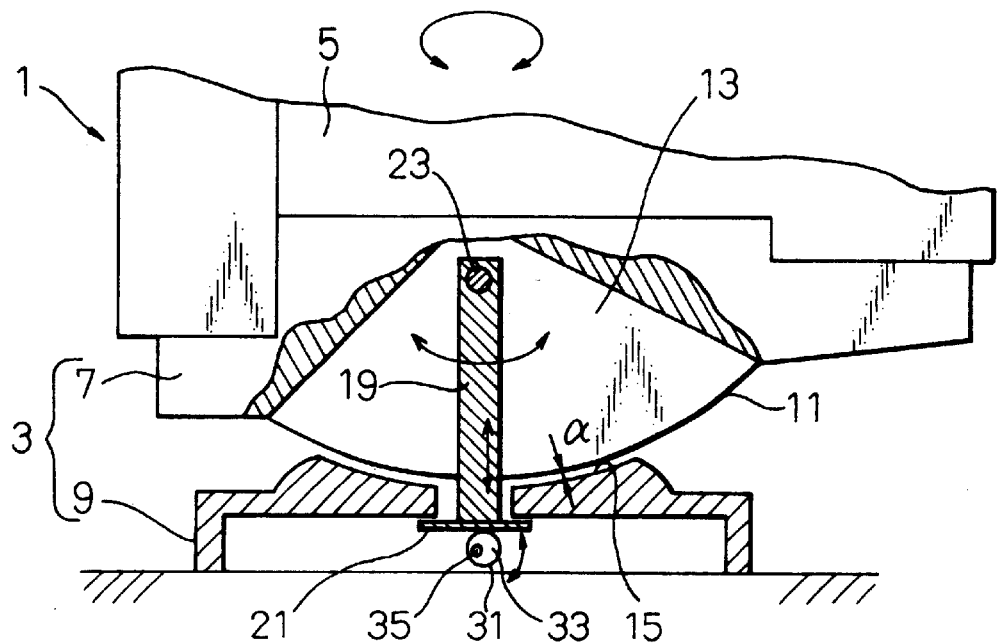
FIG. 1 is a cross-sectional side view showing a display device into to which the support of the first embodiment of the present invention is incorporated.

Referring to the accompanying drawings, a plurality of embodiments of the present invention will be explained below. In this case, the same reference characters designate the same or similar parts throughout the several embodiments, and the duplicate explanations are appropriately omitted here.

Figure 2:
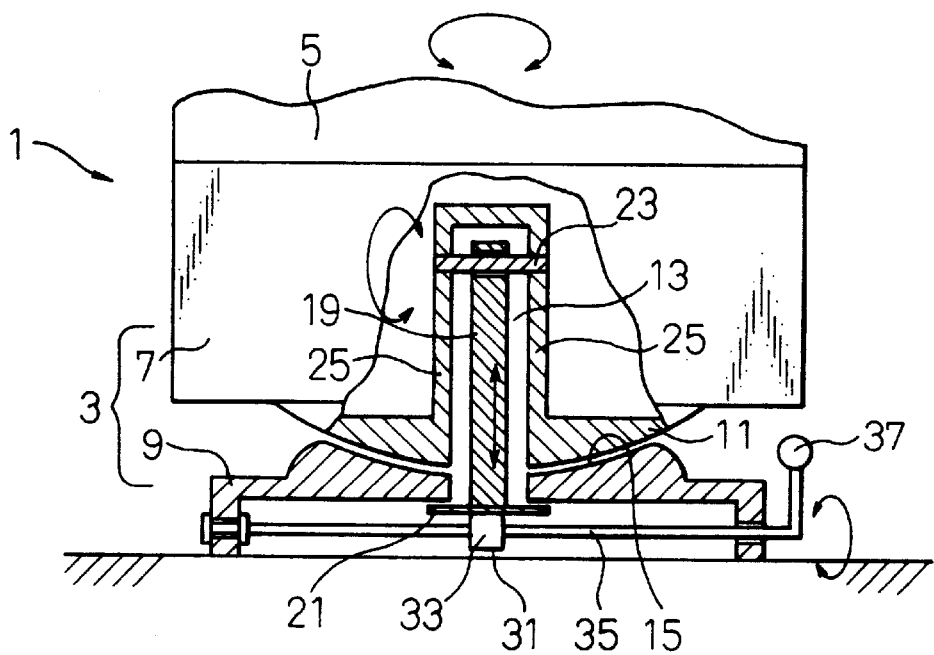
FIG. 2 is a cross-sectional right side view showing the display device illustrated in FIG. 1.

FIGS. 1 and 2 are cross-sectional views respectively showing a display device, including a television set, into which a support of the first embodiment of the present invention is incorporated.

The display device 1 illustrated in the drawings houses a support 3 for supporting the display device 1 obliquely and pivotally. The support 3 is composed of two primary components, that is, the support 3 is composed of an upper member (platform) 7 for supporting the main display body 5, and a base member 9.

As the detail is described later, the support 3 makes it possible that the platform 7 (the main display body 5) is rotated by a predetermined angle (for example, 90°) from a predetermined normal position to the right or left. Also, the support 3 makes it possible that the platform 7 is tilted up by a predetermined angle (for example, 5°) from the horizontal position. Also, the support 3 makes it possible that the platform 7 is tilted down by a predetermined angle (for example, 20°) from the horizontal position.

The platform 7 includes: a spherical convex surface (engagement surface) 11 which is formed at the center of the lower surface of the platform; and a sector-shaped cavity (space) 13 which extends in the longitudinal direction. In this connection, in the example shown in the drawings, the platform 7 is integrally formed as a portion of a casing made of plastics composing the main display body 5, however, the platform 7 may be formed separately from the casing and connected with it later.

The base member 9 includes a spherical concave surface (engagement surface) 15 which is formed at the center of the upper surface of the base member 9. The concave surface 15 agrees with the convex surface 11 of the platform 7. Therefore, the concave surface 15 and the convex surface 11 are engaged with each other spherically. In the case of the above spherical surface engagement, the concave surface 15 and the convex surface 11 are frictionally engaged with each other. Therefore, both surfaces 15 and 11 cannot be relatively moved, that is, both surfaces 15 and 11 are fixed to each other. That is, the platform 7 is fixed with respect to the base member 9 at a predetermined tilting angle position and at a predetermined rotating angle position.

At the center inside the support 3, there is provided a perpendicular shaft 19 penetrating the concave surface 15 and the convex surface 11. Therefore, the platform 7 and the base member 9 can be relatively rotated round the axis of the perpendicular shaft 19.

At the lower end of the perpendicular shaft 19, there is provided a somewhat large disk-shaped flange 21. At the upper portion of perpendicular shaft 19, there is pivotally provided a substantially horizontal shaft 23. Both end portions of the horizontal shaft 23 are fixed to the walls 25, which are opposed to each other, forming the sector-shaped cavity (space) of the platform 7 described before. The platform 7 and the perpendicular shaft 19 can be relatively rotated round the axis of the horizontal shaft 23.

In order to transfer the above two engaging surfaces from the frictional engaging state to the disengaging state, the support 3 includes a drive mechanism 31 to move the perpendicular shaft 19 upward in the direction of the axis.

The drive mechanism 31 is essentially composed of a plate cam 33 in the first embodiment. This drive mechanism 31 is described in detail as follows. There is provided an operation shaft 35 penetrating the base member 9 horizontally. One end of the operation shaft 35 is pivotally supported by one side portion of the base member 9. The other end of the operation shaft 35 penetrates the opposite side of the base member 9 and protrudes outside. This end portion is bent into an L-shape. At the forward end portion, there is provided a spherical grip portion 37.

There is provided a disk-shaped plate cam 33 at the substantial center of the operation shaft 35 inside the base member. The plate cam 33 is fixed to the operation shaft 35 at a position a little distant from the center of the operation shaft 35. The lower flange 21 attached to the perpendicular shaft 19 always comes into contact with the outer circumference of the disk-shaped cam 33 by its weight. When the operation shaft 35 is rotated, this rotating motion is transmitted to the perpendicular shaft 19 via the plate cam 33, so that the perpendicular shaft 19 is reciprocated.

When the operation shaft 35 is rotated, the perpendicular shaft 19 is raised, that is, the platform 7 (the main display body 5) is raised. In accordance with that, the frictional engaging state, in which the convex surface 11 of the platform 7 is engaged with the concave surface 15 of the base member 9, is broken off. Accordingly, clearance α is formed between them.

In this disengaging state, the platform 7 is allowed to revolve round the axis of the perpendicular shaft 19, and at the same time, the platform 7 is allowed to tilt round the axis of the horizontal shaft 23 arranged at the upper portion of the perpendicular shaft 19.

After the platform 7 (the main display body 5) has been set at a predetermined revolving angle and at a predetermined tilting angle, the operation shaft 35 is rotated reversely or normally so that an additional rotation can be given to it, and the perpendicular shaft 19 is lowered. Therefore, the convex surface 11 of the platform 7 and the concave surface 15 of the base member 11 are put into a frictional engaging state.

Due to the foregoing, the display body 5 (the platform 7) can be stably held in the frictional engaging state.

As described above, in this first embodiment, the perpendicular shaft is raised by a simple operation of the operation shaft, so that the disengaging state, in which the concave surface is disengaged from the convex surface, can be formed. Accordingly, the direction of the display body can be smoothly and easily changed by a simple operation. After that, the frictional engaging state can be provided by a simple operation of the operation shaft. Accordingly, the display body can be stably held at the position.

Figure 3:
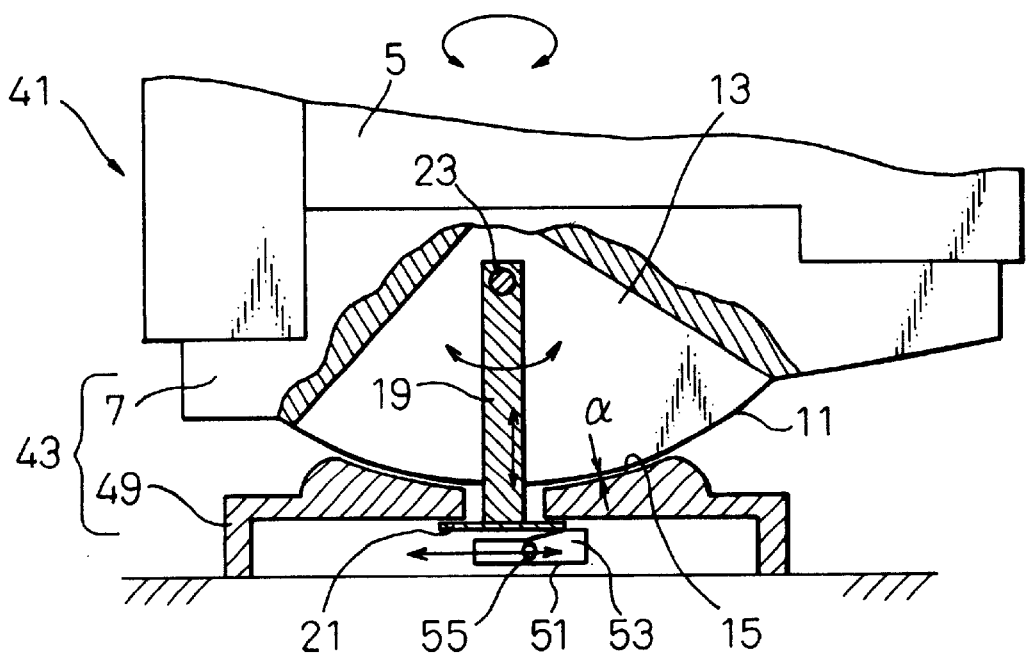
FIG. 3 is a cross-sectional side view showing a display device into which the support of the second embodiment of the present invention is incorporated.
Figure 4:
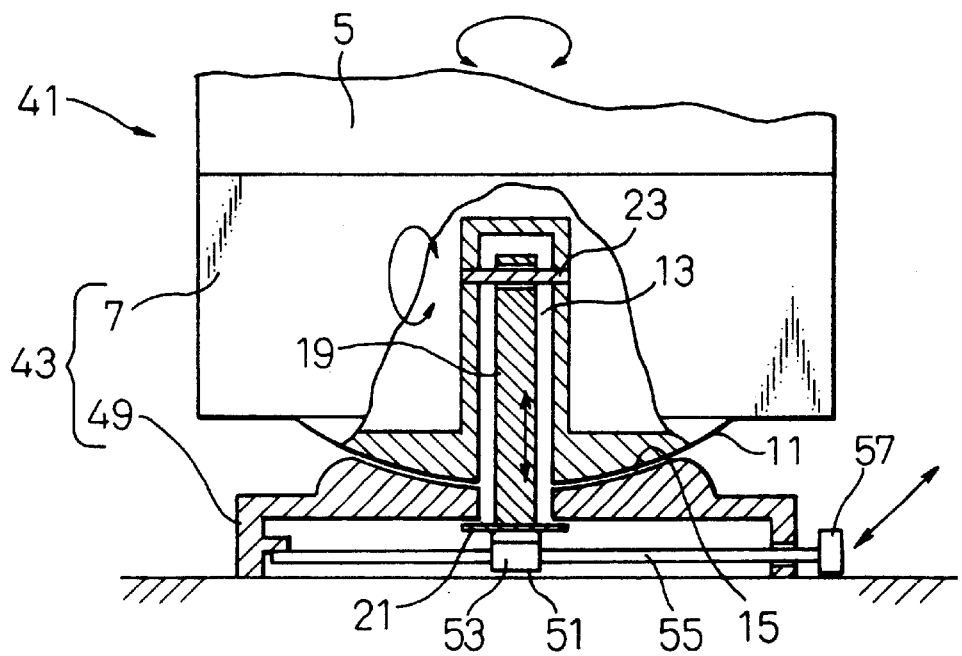
FIG. 4 is a cross-sectional right side view showing the display device illustrated in FIG. 3.

Next, reference is made to FIGS. 3 and 4 showing a display device 41 into which the support 43 of the second embodiment is incorporated. In this second embodiment, the drive mechanism 51 capable of moving the perpendicular shaft 19 upward in the axial direction is different from the drive mechanism of the first embodiment, that is, the drive mechanism 51 of this embodiment is essentially composed of a translation cam 53.

Only this drive mechanism 51 will be described in detail as follows. There is provided an operation shaft 55 penetrating the base member 49 horizontally. One end of the operation shaft 55 is pivotally supported by one side portion of the base member 49 in such a manner that the operation shaft 55 can be rotated in the horizontal direction. The other end of the operation shaft 55 penetrates a horizontal slot provided in the opposite side portion of the base member 49 and protrudes outside. At the forward end portion of the operation shaft 55, there is provided a disk-shaped grip portion 57.

There is provided a translation cam 53 at the substantial center of the operation shaft 55 inside the base member 49.

The lower flange 21 attached to the perpendicular shaft 19 always comes into contact with the surface of the translation cam 53 by its weight. When the operation shaft 55 is rotated, this rotating motion is transmitted to the perpendicular shaft 19 via the translation cam 53, so that the perpendicular shaft 19 is reciprocated.

When the operation shaft 55 is rotated, the perpendicular shaft 19 is raised, that is, the platform 7 (the main display body 5) is raised in accordance with the rotation of the operation shaft 55. In accordance with that, the frictional engaging state, in which the convex surface 11 of the platform 7 is engaged with the concave surface 15 of the base member 49, is disengaged. Accordingly, clearance α is formed between the two surfaces.

Figure 5:
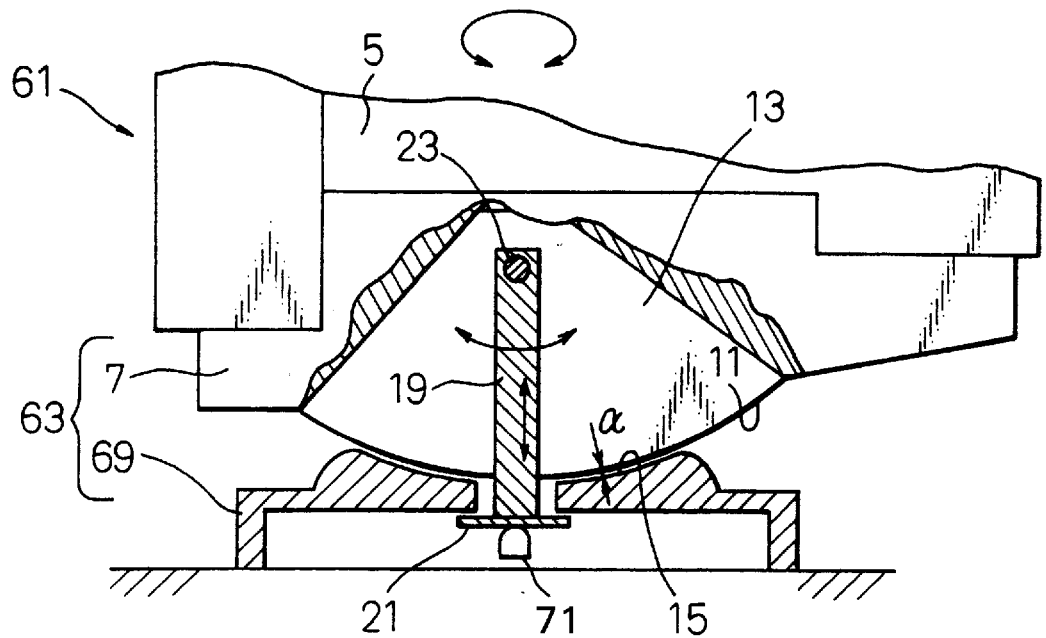
FIG. 5 is a cross-sectional side view showing a display device into which the support of the third embodiment of the present invention is incorporated.
Figure 6:
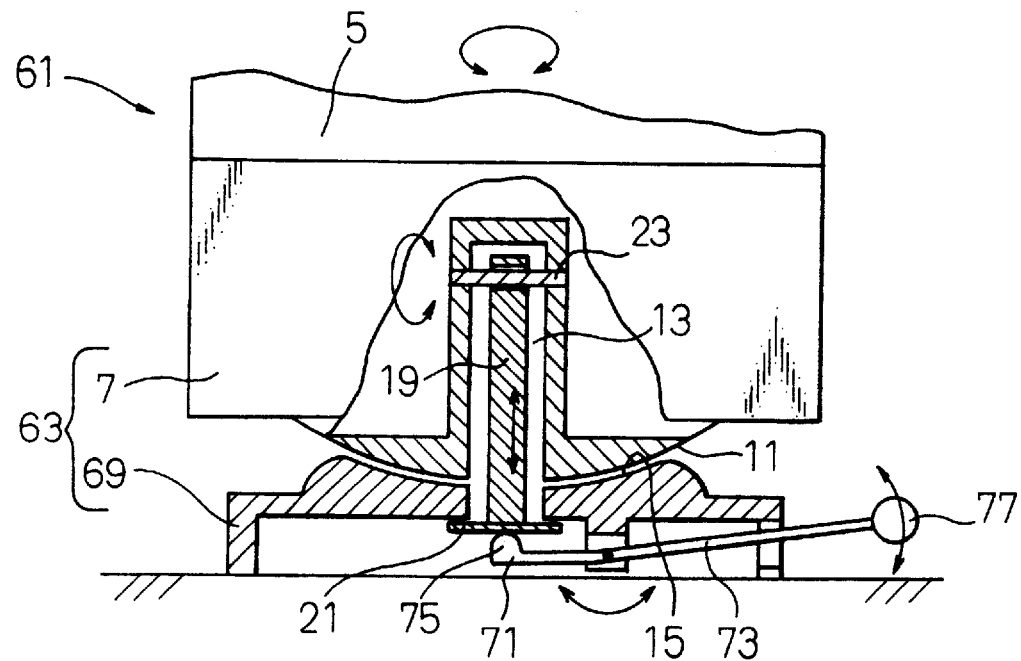
FIG. 6 is a cross-sectional right side view showing the display device illustrated in FIG. 5.

Finally, reference is made to FIGS. 5 and 6 showing a display device 61 into which the support 63 of the third embodiment is incorporated. In this third embodiment, the drive mechanism 71 capable of moving the perpendicular shaft 19 upward in the axial direction is different from the drive mechanisms of the first and the second embodiment, that is, the drive mechanism 71 of this embodiment is essentially composed of a lever 73.

Only this drive mechanism 51 will be described in detail as follows. There is provided a lever 73 penetrating the base member 69 in a substantial horizontal direction. A middle portion of the lever 73 is pivotally supported by an inside middle portion (fulcrum) of the base member 69 in such a manner that the lever 73 is rotated like a seesaw. There is provided a semispherical pushing section 75 at the forward end of the lever located inside the base member. An upper portion (point of application) of the pushing section 75 comes into contact with the flange 21 attached in the lower portion of the perpendicular shaft 19. There is provided a spherical grip section (a point at which a force is given) 77 at the other end of the lever 73 located outside the base member 69.

Accordingly, when the grip section 77 of the lever 73 is pushed down, the pushing section 75 at the forward end of the lever pushes up the perpendicular shaft 19 in the axial direction. Due to the foregoing, the frictional engaging state, in which the convex surface 11 of the platform 7 is engaged with the concave surface 15 of the base member 69, is disengaged. Accordingly, clearance α is formed between the two surfaces.

As described above, according to the present invention, it is possible to solve the conventional problems. Therefore, it is possible to provide a compact support device which can be smoothly and easily operated and positively fixed.

It is to be understood that the invention is by no means limited to the specific embodiments illustrated and described herein, and that various modifications thereof may be made which come within the scope of the present invention as defined in the appended claims.

What is claimed is:

1. A support device for tiltably and rotatably supporting an electronic device, comprising:

an upper member to support the electronic device;

a base member engageable with said upper member;

a convex engagement surface provided on one of the upper member and the base member;

a concave engagement surface provided on the other of the upper member and the base member, the profile of the concave engagement surface agreeing with that of the convex engagement surface;

a drive mechanism for transferring a state of engagement of the convex engagement surface with the concave engagement surface from a frictional engaging state to a disengaged state;

a perpendicular shaft penetrating both engagement surfaces, wherein the upper member and the base member can be relatively rotated round an axis of the perpendicular shaft; and a horizontal shaft arranged in an upper portion of the perpendicular shaft, wherein the upper member and the perpendicular shaft can be relatively rotated round an axis of the horizontal shaft.

2. The support device according to claim 1, wherein the drive mechanism can move the perpendicular shaft in the upward direction for transferring a state.

3. The support device according to claim 2, wherein the drive mechanism includes a lever.

4. A support device for tiltably and rotatably supporting an electronic device, comprising:

an upper member to support the electronic device;

a base member engageable with said upper member;

a convex engagement surface provided on one of the upper member and the base member;

a concave engagement surface provided on the other of the upper member and the base member, the profile of the concave engagement surface agreeing with that of the convex engagement surface;

a drive mechanism for transferring a state of engagement of the convex engagement surface with the concave engagement surface from a frictional engaging state to a disengaged state; and a perpendicular shaft penetrating both engagement surfaces, wherein the upper member and the base member can be relatively rotated round an axis of the perpendicular shaft;

wherein the drive mechanism includes a plate cam and the drive mechanism can move the perpendicular shaft in the upward direction for transferring a state.

5. A support device for tiltably and rotatably supporting an electronic device, comprising:

an upper member to support the electronic device;

a base member engageable with said upper member;

a convex engagement surface provided on one of the upper member and the base member;

a concave engagement surface provided on the other of the upper member and the base member, the profile of the concave engagement surface agreeing with that of the convex engagement surface;

a drive mechanism for transferring a state of engagement of the convex engagement surface with the concave engagement surface from a frictional engaging state to a disengaged state; and a perpendicular shaft penetrating both engagement surfaces, wherein the upper member and the base member can be relatively rotated round an axis of the perpendicular shaft wherein the drive mechanism includes a translation cam and can move the perpendicular shaft in the upward direction for transferring a state.

* * * * *